(12) United States Patent
Kjoller et al.

(10) Patent No.: US 8,857,247 B2
(45) Date of Patent: Oct. 14, 2014

(54) PROBE FOR A SCANNING PROBE MICROSCOPE AND METHOD OF MANUFACTURE

(75) Inventors: Kevin J. Kjoller, Santa Barbara, CA (US); Ami Chand, Goleta, CA (US); Nihat Okulan, Los Angeles, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 12/123,363

(22) Filed: May 19, 2008

(65) Prior Publication Data

US 2008/0282819 A1    Nov. 20, 2008

Related U.S. Application Data

(63) Continuation of application No. 11/089,165, filed on Mar. 24, 2005, now abandoned.

(51) Int. Cl.
*G01D 21/00* (2006.01)
*G01Q 60/38* (2010.01)
*B82Y 35/00* (2011.01)

(52) U.S. Cl.
CPC *G01Q 60/38* (2013.01); *B82Y 35/00* (2013.01)
USPC .......................................................... 73/105

(58) Field of Classification Search
None
See application file for complete search history.

(56) References Cited

U.S. PATENT DOCUMENTS

| | | | |
|---|---|---|---|
| 5,221,415 A * | 6/1993 | Albrecht et al. | 216/2 |
| 5,253,515 A * | 10/1993 | Toda et al. | 73/105 |
| 5,262,643 A * | 11/1993 | Hammond et al. | 850/3 |
| 5,319,961 A | 6/1994 | Matsuyama et al. | |
| 5,386,110 A | 1/1995 | Toda | |
| 5,406,832 A * | 4/1995 | Gamble et al. | 73/105 |
| 5,519,212 A * | 5/1996 | Elings et al. | 250/234 |
| 5,831,181 A * | 11/1998 | Majumdar et al. | 73/863 |
| 5,973,259 A * | 10/1999 | Edelson | 136/254 |
| 6,021,665 A | 2/2000 | Hayashi et al. | |
| 6,246,652 B1 * | 6/2001 | Kikukawa et al. | 369/53.38 |
| 6,862,925 B2 | 3/2005 | Desponet et al. | |
| 6,935,167 B1 | 8/2005 | Sahin et al. | |
| 7,107,825 B2 * | 9/2006 | Degertkin et al. | 73/105 |
| 7,119,332 B2 | 10/2006 | Cho et al. | |

FOREIGN PATENT DOCUMENTS

| | | |
|---|---|---|
| JP | 10-332717 | 12/1998 |
| JP | 11-271347 | 10/1999 |

OTHER PUBLICATIONS

Translation of JP 10-332717, translated Jul. 2011.*

* cited by examiner

*Primary Examiner* — Robert R Raevis
(74) *Attorney, Agent, or Firm* — Boyle Fredrickson S.C.

(57) ABSTRACT

A probe assembly for an instrument and a method of manufacture includes a substrate and a cantilever having a length that is independent of typical alignment error during fabrication. In one embodiment, the probe assembly includes a buffer section interposed between the substrate and the cantilever. The cantilever extends from the buffer section and a portion of the buffer section extends beyond an edge of the substrate. The portion of the buffer section is more stiff than the cantilever. The corresponding method of producing the probe assembly facilitates batch fabrication without compromising probe performance.

12 Claims, 8 Drawing Sheets

PROBE FOR A SCANNING PROBE MICROSCOPE AND METHOD OF MANUFACTURE

CROSS-REFERENCE TO RELATED APPLICATION

This application is a continuation application of U.S. Ser. No. 11/089,165, filed on Mar. 24, 2005, now abandoned which is expressly incorporated by reference herein.

BACKGROUND OF THE INVENTION

1. Field of the Invention

The present invention is directed to a probe assembly for a metrology instrument used to measure a property of a sample, and more particularly, a probe assembly including a cantilever having a short length to support high bandwidth operation, and configured for ready batch fabrication.

2. Description of Related Art

Scanning probe microscopes (SPMs), such as the atomic force microscope (AFM), are devices which use a sharp tip and low forces to characterize the surface of a sample down to atomic dimensions. Generally, the tip of the SPM probe is introduced to the sample surface to detect changes in the characteristics of the sample. By providing relative scanning movement between the tip and the sample, surface characteristic data can be acquired over a particular region of the sample and a corresponding map of the sample can be generated.

In an AFM, for example, in a mode of operation called contact mode, the microscope typically scans the tip, while keeping the force of the tip on the surface of the sample generally constant. This is accomplished by moving either the sample or the probe assembly up and down relatively perpendicularly to the surface of the sample in response to a deflection of the cantilever of the probe assembly as it is scanned across the surface. In this way, the data associated with this vertical motion can be stored and then used to construct an image of the sample surface corresponding to the sample characteristic being measured, e.g., surface topography. Similarly, in another preferred mode of AFM operation, known as TappingMode™ (TappingMode™ is a trademark owned by the present assignee), the tip is oscillated at or near a resonant frequency of the associated cantilever of the probe. The amplitude or phase of this oscillation is kept constant during scanning using feedback signals, which are generated in response to tip-sample interaction. As in contact mode, these feedback signals are then collected, stored and used as data to characterize the sample.

The deflection of the cantilever in response to the probe tip's interaction with the sample is measured with an extremely sensitive deflection detector, most often an optical lever system. In such optical systems, a lens is employed to focus a laser beam, from a source typically placed overhead of the cantilever, onto the back side of the cantilever. The backside of the lever is reflective (for example, using metalization during fabrication) so that the beam may be reflected therefrom towards a photodetector. The translation of the beam across the detector during operation provides a measure of the deflection of the lever, which again is indicative of one or more sample characteristics.

One area of continuing SPM development relates to the speed of operation. In this regard, the greater the resonant frequency of the cantilever of the probe of the probe assembly the greater the speed at which the SPM can be operated to acquire sample surface data. One way in which high operational resonant frequencies, and thus improved SPM imaging speed, can be facilitated is by using a probe having a cantilever that is much shorter than the typical length of about 100-400 microns. This is due to the fact that, with a shorter lever, the instrument can be operated at a higher resonant frequency with less noise. Therefore, keeping the same spring constant, one can operate the SPM faster while obtaining high integrity data given a greater signal to noise ratio. Preferably, a probe having a cantilever that is less than 50 microns or even less than 20 microns is preferred for such applications.

One significant drawback associated with using probes having short cantilevers, however, is that for a number of reasons it is very difficult to bulk manufacture probes having cantilevers with such short lengths, i.e., in the sub-50 micron range. In most such processes, the lever is formed, as well as the tip, using micro fabrication techniques that require precise alignment of the manufacturing tools (e.g., photolithography masks, etc.) and precise processing of the probe components, including bonding a substrate to the formed probe prior to dicing the substrate into individual probe assemblies. In the latter regard, when producing short levered probes, it is nearly impossible to accurately control the dicing from the backside of the batch fabricated probe assemblies given alignment inaccuracies in the process. This causes an offset between the edge of the diced substrate and the tip or distal end of the cantilever. This offset cannot be readily controlled. As a result, probe assemblies having profiles such as that shown in FIGS. 1A-1C may result. In particular, for example, FIG. 1A illustrates a probe assembly 15 having a lever 16 with a length about 30 microns, as desired. However, given alignment inaccuracies and related complicating factors during fabrication, the probe assembly 15' of the next batch may be formed such that the glass substrate 18 bonded to the probe yields no cantilever, such as that shown in FIG. 1B. Finally, in the next batch, as shown in FIG. 1C, the probe assembly 15" may have a cantilever 16' with a significantly greater length, such as 60 microns. In sum, the offset from the edge of the substrate to the tip upon bonding and dicing the substrate, hereinafter called the "uncontrollable offset", yields a cantilever having a length that cannot be predictably controlled, assuming the cantilever is formed at all.

In this regard, two specific types of probes employing silicon nitride cantilevers are shown in FIGS. 2A (glass substrate) and 2B (silicon substrate). In FIG. 2A, a probe assembly 20 includes a probe 21 having a silicon tip 22 and a silicon nitride lever 24 that extends from a glass substrate 26. In this case, the substrate 26 is bonded directly to the silicon nitride that forms and defines the length of cantilever 24. As a result, when batch fabricating such a probe, the uncontrollable offset, "0", as shown in FIG. 2C, present when the probes are diced operates to limit the manufacturer's ability to produce repeatable probe assemblies having a short, for instance, sub-20 micron, length. More particularly, standard mechanical dicing operations have inherent alignment errors (typically, as much as tens of microns) that, though acceptable for fabricating conventional probes, is unacceptable for fabricating the type of short probes contemplated herein. In FIG. 2B, a self-actuated probe assembly 30 includes a probe 32 having an integrated actuator 34 and a base substrate 35 made of silicon. A cantilever 36 of probe 32 made of silicon extends from actuator 34 defined by top and bottom gold electrodes 38, 40, respectively, and an active element 42, such as zinc oxide. Here again the substrate 35 is bonded directly to the silicon nitride layer, or electrode 38, that defines cantilever 36. In this case, the individual probe assemblies are released with an appropriate etch of the sacrificial silicon. Due to processing limitations, performing this etch with sufficiently high precision to cost-effectively define cantilevers 36 having repeatable lengths in the sub-20 micron scale is generally impossible, as understood in the art. In particular, in this case, the length of the cantilever is typically defined by front-side and back-side etches of the substrate. It is very difficult to control these etches to define short (e.g., sub-20 micron) levers because of orthogonality and parallax considerations, as understood in the art.

In view of the above, the art of scanning probe microscopy was in need of a probe assembly having a short lever, i.e., less than 20 microns, and a corresponding method of batch fabricating the probe such that the length of its associated cantilever can be precisely controlled and batch processed independent of inherent alignment errors associated with fabrication processes in which the probes are either diced or etched. This control of the length of the cantilever should be realized without compromising the physical properties of the probe. For instance, the spring constant must be maintained so that the probe is capable of operating at high bandwidth, thus allowing the SPM to perform high speed imaging.

Note that "SPM" and the acronyms for the specific types of SPMs, may be used herein to refer to either the microscope apparatus, or the associated technique, e.g., "atomic force microscopy."

SUMMARY OF THE INVENTION

The preferred embodiment overcomes the drawbacks of prior art systems by providing a probe that is manufactured so that its length is independent of inherent alignment error(s) associated with the process. In one embodiment, the probe includes a buffer section intermediate the substrate and the cantilever, thus eliminating the drawbacks associated with the uncontrollable offset (caused by alignment error during dicing) present in known techniques of batch fabricating probes. The buffer section allows the length of the cantilever to be precisely defined, in the sub-20 micron range, and is sufficiently stiff to allow the cantilever extending therefrom to freely oscillate at high resonant frequencies. In an alternative in which the probe is etched from the front and back sides of a substrate, the length of the cantilever is independent of conventional alignment errors caused by orthogonality and parallax issues during the etch fabrication process.

According to a first aspect of the preferred embodiment, a probe assembly for an instrument for imaging a sample includes a substrate, a cantilever and a buffer section interposed between the substrate and the cantilever. In this case, the cantilever extends from the buffer section and, preferably, a portion of the buffer section extends beyond an edge of the substrate and is more stiff than the cantilever.

According to another aspect of the preferred embodiment, the buffer section is made of silicon oxide and is at least two times thicker than the cantilever.

In another aspect of this embodiment, the buffer section is corrugated and made of the same material as the cantilever.

According to a still further aspect of the preferred embodiment, the probe assembly includes a tip, and the corrugation of the buffer section has a depth not limited by a height of the tip which extends generally orthogonally from the cantilever.

In another aspect of this embodiment, a cantilever has a thickness between about 10 nm and 1000 nm and the buffer section is designed to be substantially stiffer than the cantilever.

In yet another aspect of this preferred embodiment, the length of the cantilever is less than about 10 microns.

In an even still further aspect of the preferred embodiment, an operational resonant frequency of the cantilever is in a range of about 300 to 1000 kHz.

According to an alternate aspect of the preferred embodiment, a method of fabricating a probe for an instrument includes forming a probe assembly having a cantilever and a tip. The method further includes producing a buffer section, from which the cantilever extends. The method also includes bonding a substrate to the buffer section and dicing the substrate so that at least a portion of the buffer section extends beyond an edge of the substrate.

In another aspect of this embodiment, the buffer section is a layer of silicon oxide having a thickness substantially greater than a thickness of the cantilever.

In yet another aspect of this preferred embodiment, the buffer section is corrugated so as to define a plurality of trenches having a depth selected to control the stiffness of the portion.

According to a still further aspect of the preferred embodiment, the forming step includes depositing silicon nitride on a sacrificial silicon wafer. Preferably, the substrate is either silicon or glass.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 1A:
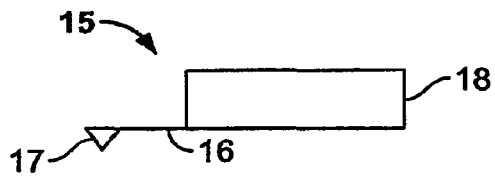
FIGS. 1A-1C are schematic side elevational views of a prior art probe, illustrating the lack of control over the position of the tip, and thus the length of the cantilever.
Figure 1B:
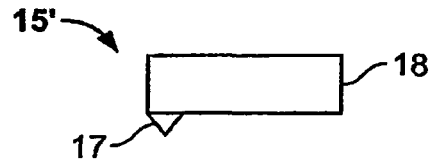
Figure 1C:
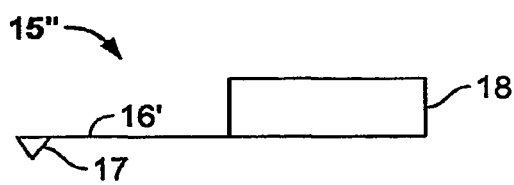
Figure 2A:
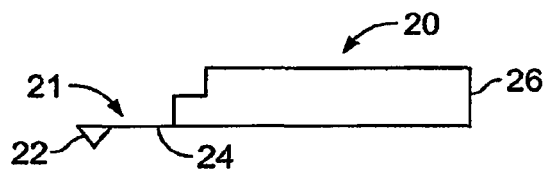
FIG. 2A is a schematic elevational side view of a prior art probe.
Figure 2B:
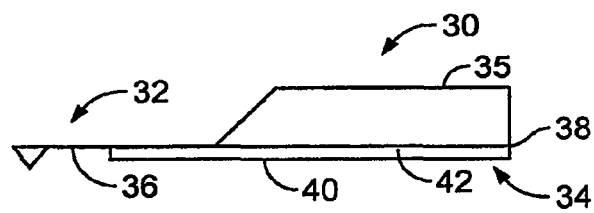
FIG. 2B is a schematic side view of a prior art probe having an integrated actuator.
Figure 2C:
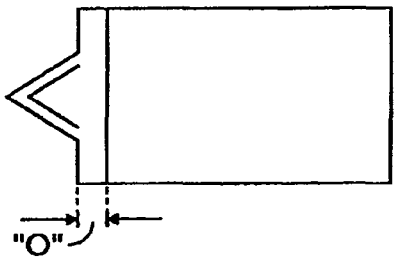
FIG. 2C is a schematic top view of a prior art probe illustrating an offset "O".
Figure 3:
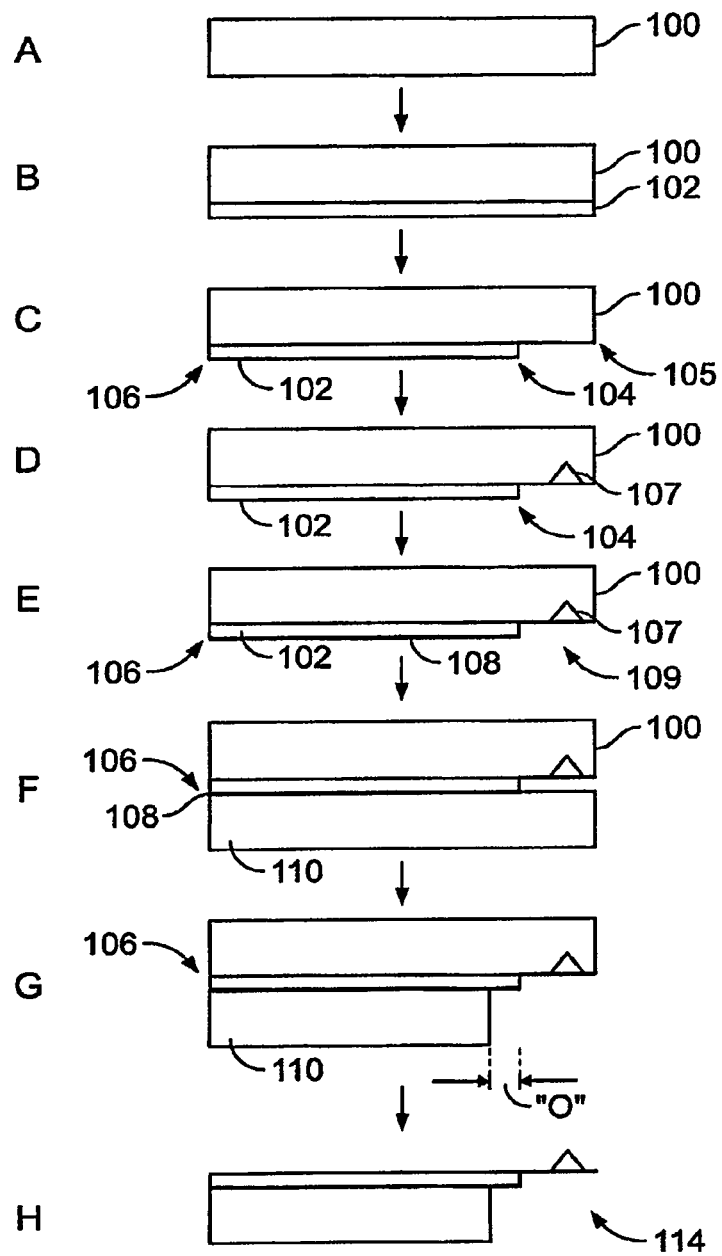
FIG. 3 is a series of schematic side elevational illustrations showing the steps to batch microfabricate a probe assembly according to a preferred embodiment, the bottom illustration showing the probe having a short cantilever extending from a thick, and thus stiff, buffer section.

Turning initially to FIG. 3, the bulk production of a probe assembly having a short, sub-20 micron cantilever, is illustrated in a series of fabrication steps. Moving from top to bottom, the process is initiated with a sacrificial silicon wafer 100 provided in step A. Then, a buffer layer 102 is deposited on the back side of wafer 100 in step B. Buffer layer 102 may be a silicon oxide or a silicon nitride, for instance, and will interface the flexible cantilever of the probe, described further below. Layer 102 is designed to be much stiffer than the cantilever that will ultimately extend therefrom, and facilitates batch fabrication of the probe assembly by eliminating the uncontrollable offset that can result when dicing the probes, and specifically the substrate coupled to the probe during process. This stiffness is preferably achieved by forming layer 102 to have a significantly greater thickness than the layer that will become the cantilever. For instance, the thickness of layer 102 can be about 1-2 microns, but it can be much larger if desired. Overall, the stiffness of the buffer layer 102 is preferably about an order of magnitude greater than that of the cantilever.

Next, in step C the buffer layer 102 is etched to an appropriate point 104 relative to an end point 105 of wafer 100 so as to form a buffer section 106 and expose wafer 100 for forming a pit 107 in step D to accommodate a tip of the probe. Notably, this etch is performed using standard planar processing used, for example, in semiconductor fabrication processes. As understood in the art, such processes are highly precise. Then, a thin layer 108 of silicon nitride is disposed on buffer layer 102 and the exposed portion of silicon wafer 100 in step E so as to form a cantilever 109 which will be released as part of the probe assembly in a later step. This layer 108 of nitride is approximately 10-1000 nm thick to provide a flexible cantilever 109 having an appropriate spring constant. Preferably, the spring constants of the short cantilevers of the preferred embodiments are similar to the spring constants of conventional AFM probes to maintain performance. For example, the resonant frequency of a standard TappingMode™ cantilever is typically about 300 kHz. To do so, the thickness of the levers are preferably reduced to accommodate their shorter length. Also in step E, a thin layer of silicon nitride will be deposited in pit 107.

In the next step of the fabrication process, step F, a glass (or silicon) substrate 110 is bonded to the silicon nitride layer 108 that defines cantilever 109 such that substrate 110 is coupled to cantilever with at least a portion of buffer layer 102 intermediate the two. Preferably, the bonding is accomplished using conventional bonding techniques. Thereafter, the probes are cut or diced in step G. It is this step, as discussed previously, that is difficult to control due to an inherent alignment error associated with the mechanical equipment used to dice the substrate, i.e., it is this error that results in what may be called an uncontrollable offset, labeled "O" in step G. By ensuring that this portion of buffer section 106 is stiff (together with the precise etch of step C), the cantilever extending therefrom can be formed with a precise length while maintaining the physical properties of the probe. More particularly, given the use of buffer section 106, the dicing operation has generally no impact on controlling the length of the lever 109, the fixed end of the cantilever 109 having been defined when etching the thick buffer layer 102 to form buffer section 106. Finally, in step H, the resultant probe assembly 114 according to this embodiment is completed by a silicon etch to remove the silicon of the initial sacrificial wafer 100.

Again, given its thickness, the flexibility of buffer section 106 is negligible compared to the flexibility of the silicon nitride cantilever 109 (lever 109 having a spring constant "k" preferably equal to a range of about 0.005 to 100 N/m). This embodiment is particularly adapted for use with a glass substrate.

Figure 4:
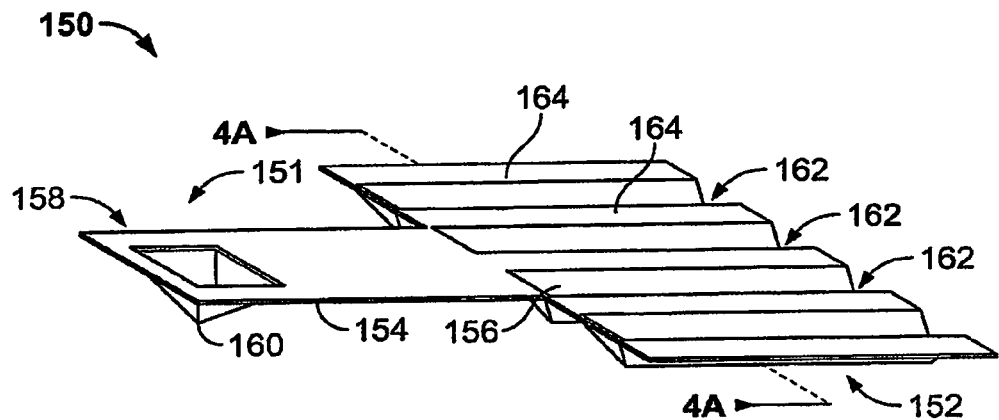
FIG. 4 is a perspective view of a probe assembly according to another preferred embodiment of the invention, the probe having a short cantilever extending from a corrugated buffer section.

Turning to FIG. 4, an alternate probe assembly 150 according to the present invention includes a probe 151 and a buffer section 152 that is produced so as to have a corrugated shape. In this case, buffer section 152 is formed by etching a base silicon wafer and depositing, for example, a silicon nitride layer thereafter, as described in further detail below in connection with FIG. 5. A cantilever 154 is also produced via the deposition of the silicon nitride and extends from section 152 so that it may flex about its base 156 defining the interface between cantilever 154 and buffer section 152. As usual, cantilever 154 includes a distal end 158 from which a tip 160 extends generally orthogonally for interacting with a surface of a sample under test (not shown).

Corrugated buffer section 152 includes a plurality of trenches 162 that operate to stiffen probe 150 in a region of the probe assembly 150 defining the uncontrollable offset associated with producing probes having short cantilevers, described previously. As a result, the more flexible cantilever 154 extending therefrom is defined in a region where the length of the lever can be predictably controlled, and thus batch reproduced. In between trenches 162 lie flat portions 164 that are adapted for ready bonding of a glass or silicon substrate thereto.

Ideally, base 156 of cantilever 154 is rigidly fixed to buffer section 152 such that, for instance, cantilever oscillation in TappingMode™ does not include any corresponding movement of buffer section 162. Therefore, buffer section 162 should be as stiff as possible. In this regard, the depth of trenches 162 at least partially defines the stiffness of buffer section 152. However, given processing constraints associated with forming trenches 162 on the same side of the wafer as tip 160, the depth of trenches 162 is limited to the height of the desired tip 160. Therefore, because tip heights are typically small, at least smaller than trench depth that would provide ideal stiffness to buffer section 152, this limitation may hinder ideal performance in certain applications. In this regard, one possible alternative is illustrated in FIGS. 6-9, discussed below. Overall, an uncontrollable offset of probe assembly 150 is defined by corrugated buffer section 152, which is not a factor in batch fabricating the probe assemblies having short, sub-20 micron cantilevers 154.

Figure 4A:
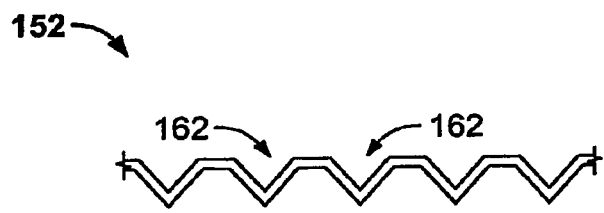
FIG. 4A is a partially broken away cross-sectional view of the corrugated section of the probe assembly along line 4A-4A of FIG. 4.
Figure 5:
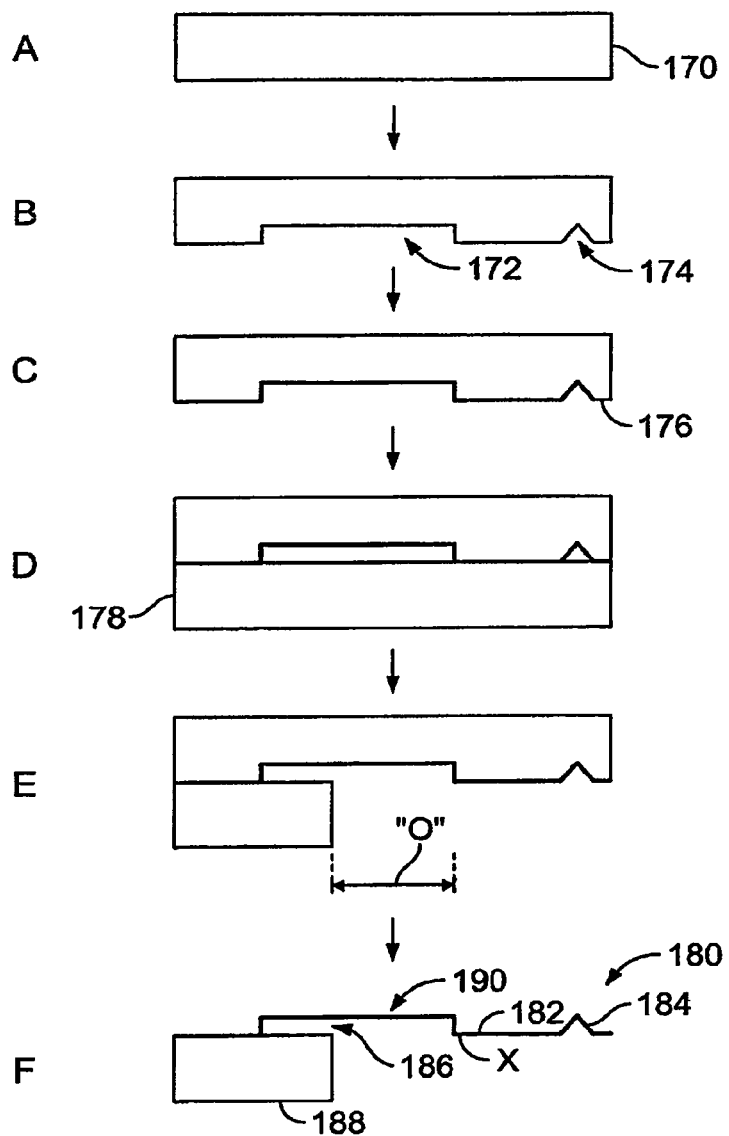
FIG. 5 is a series of schematic side elevational illustrations showing the steps to batch microfabricate the probe assembly of FIG. 4.

Turning to FIG. 5, the fabrication of probe assembly 150 is illustrated as a series of process steps. Initially, at step A, a sacrificial wafer 170 is provided. Then, at step B, the corrugated buffer section is selectively patterned to produce the series of trenches, as well as the probe tip at locations 172 and 174, respectively. At this point, step C, a thin silicon nitride layer 176 is deposited to, inter alia, form the cantilever. Layer 176 has a thickness of about 100 nm. Thereafter, a substrate 178 is bonded to the silicon nitride according to known techniques at step D of the process. At step E, the wafer is diced into individual probe assemblies using standard alignment procedures. Notably, at this point, an offset labeled "O", which again cannot be readily controlled due to imperfect alignment of the mechanical dicing apparatus relative to the probe (i.e., alignment error), is defined. However, as noted in connection with the previous embodiment illustrated in FIG. 3, the length of the cantilever is not controlled by this dicing operation and thus the bulk processing problem associated with the uncontrollable offset present in standard techniques is avoided. The length of the cantilever is instead defined in part by an end point of the trenches, a known position relative to tip. Notably, a portion of corrugated buffer section 152 at step "E" is shown in FIG. 4A, wherein the silicon trenches include a thin layer of silicon nitride 176.

Finally, at step F, the silicon wafer 170 is etched from the front side to expose a lever 182 and a tip 184. Tip 184 is preferably silicon nitride, and is defined by a thin shell. As a result, a probe assembly 180 having a corrugated buffer section 186, a portion 190 of which extends beyond an edge of substrate section 188 is produced. Cantilever 182 extends from buffer section 186 at a point "X" about which the cantilever can oscillate, as in TappingMode™. Again, the depth of the trenches of corrugated section 186 is limited by the height of tip 184, as appreciated by those skilled in the microfabrication art.

Figure 6:
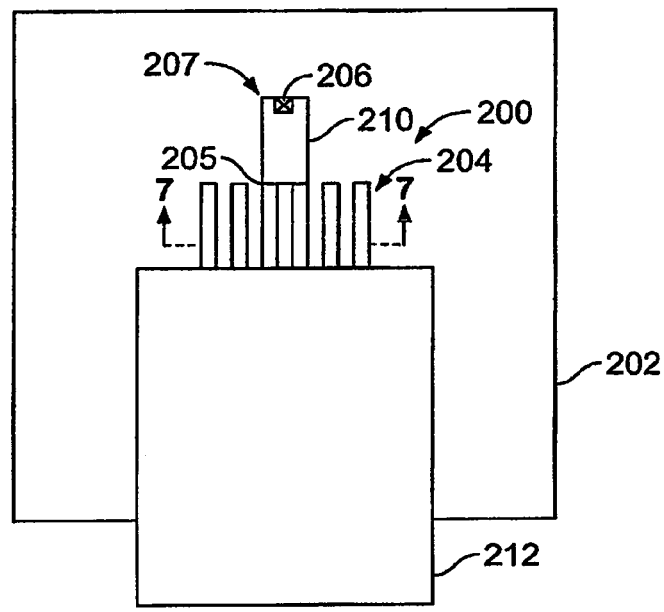
FIG. 6 is a top plan view of a probe assembly being fabricated according to another preferred embodiment similar to the probe produced as shown in FIG. 5, where the corrugation is not limited by tip height.
Figure 7:
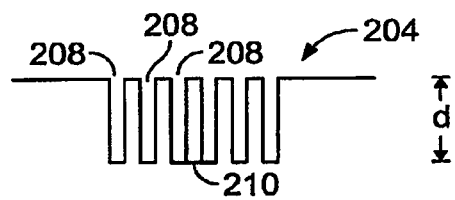
FIG. 7 is a cross-sectional front view of the probe assembly of FIG. 6, along line 7-7.
Figure 8:
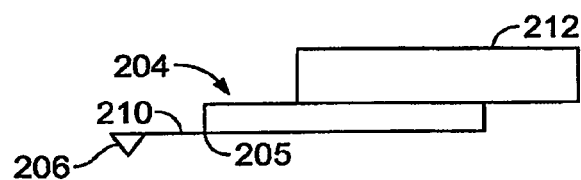
FIG. 8 is a side elevational view of the resultant probe assembly fabricated as shown in FIG. 6.

Turning to FIGS. 6-8, a probe assembly 200 fabricated from a silicon wafer 202 is shown. Probe assembly 200 is similar to probe assembly 180 shown in FIG. 5. However, in this case, a corrugated buffer section 204 of probe assembly 200 is formed on a side of wafer 202 opposite the side where a tip 206 of probe assembly 200 is formed, and thus buffer section 204 may have a greater range of depths "d" (see FIG. 7), and thus a greater range of stiffnesses than the probe assembly shown in FIG. 4. In addition, the cross-sectional shape of the series of trenches 208 of buffer section 204 is rectangular rather than pyramid-shaped.

Probe assembly 200 includes a cantilever 210 extending from the rigid buffer section 204 at about a fixed point 205. With further reference to FIGS. 6 and 8, cantilever 210 also includes a distal end 207 opposite fixed end or point 205 which supports tip 206 that is used for interacting with a surface of a sample in conventional fashion. Probe assembly 200 also includes a glass substrate 212 upon dicing the wafer to form the individual probe assemblies prior to releasing the probes from the wafer, described in further detail below with respect to FIG. 9.

Preferably, as shown in FIGS. 7 and 8, trenches 208 are formed in the silicon wafer 202 opposite the side used to form the pit for tip 206. As a result, more design flexibility is realized in terms of achievable stiffness of buffer section 204. The length of the buffer section 204, defined at least in part by the bonded and diced glass substrate 212 and a fixed end 205 of probe 202, generally corresponds to what has been described earlier as the uncontrollable offset "O" associated with known probe fabrication techniques. Because the length of probe 200 is not controlled by the dicing of the substrate 212, this offset is not the problem it is in known techniques, and thus bulk fabrication of probe assemblies 200 is facilitated.

Figure 9:
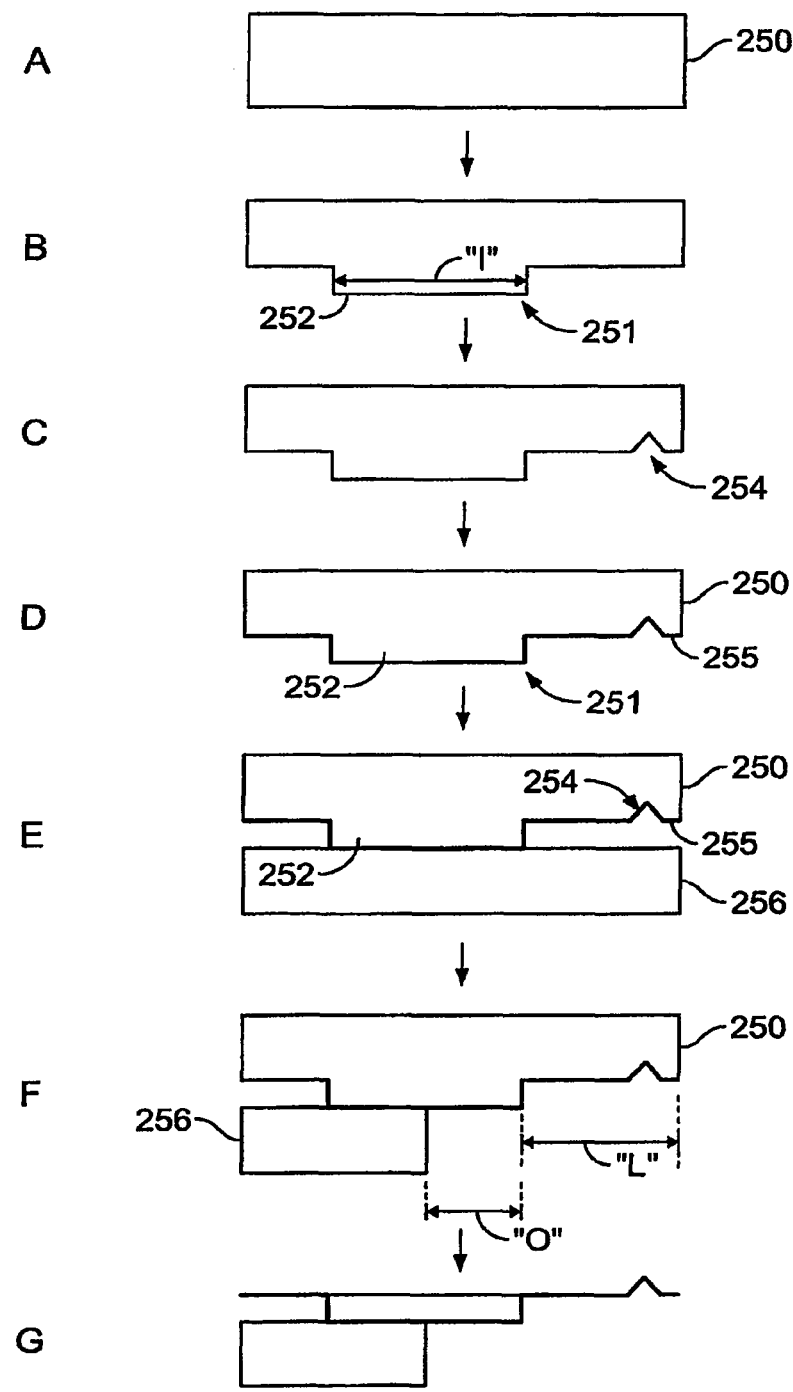
FIG. 9 is a series of schematic side elevational illustrations showing the steps to batch microfabricate the probe assembly shown in FIGS. 6-8, the bottom illustration corresponding to FIG. 8.

To form probe 200 reference is made to FIG. 9. Similar to the previous probes, the process starts with a sacrificial silicon wafer 250 at step A. A wet or dry etch is then employed at step B, for instance, from the back side of wafer 250, to form a corrugated buffer section 251 defined by a series of trenches 252. Notably, the length "l" of trenches 252 can be precisely controlled using known techniques. Next, in step C, a pit 254 for forming a tip is etched in wafer 250. A thin layer 255 of silicon nitride is then deposited on the etched wafer in step D. Thereafter, a substrate 256 (glass or silicon) is bonded to trenches 252 of wafer (step E), and then cut to form the individual probe assemblies in step F. An uncontrollable offset associated with this step E is shown at "O" for illustrative purposes. To the contrary, a length "L" of a resultant cantilever 258 can be precisely controlled, again due to the fact that the dicing of the probes does not control cantilever length; rather, edges of wafer 250 and corrugated buffer section 251 define cantilever length, which may be on the order of less than 20 microns, and preferably less than 10 microns. Finally, in step G, the sacrificial silicon 250 is etched to release the probes.

Figure 10:
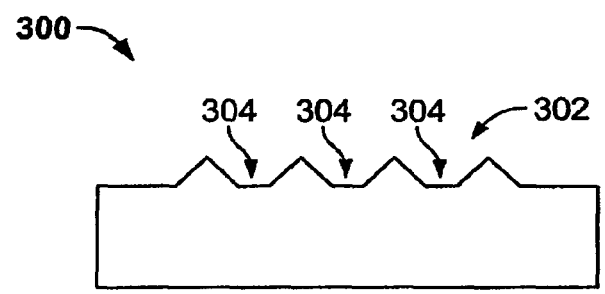
FIG. 10 is back elevational view of a probe assembly fabricated according to the present invention, similar to the probe of FIGS. 6-9 but having pyramid shaped corrugation, similar to the probe of FIG. 4.
Figure 11:
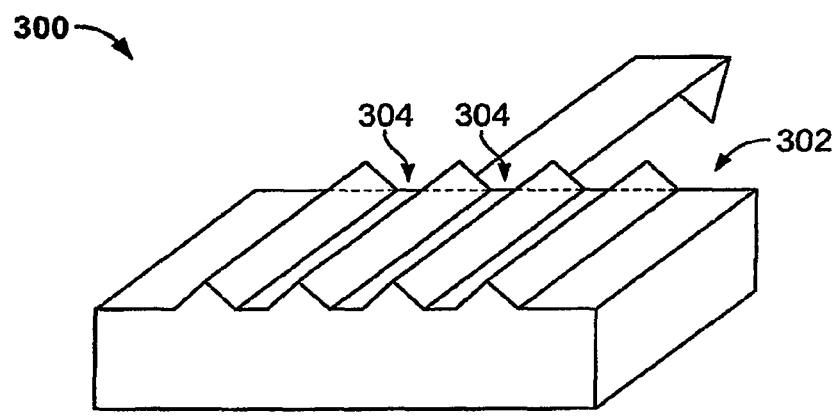
FIG. 11 is a perspective view of the probe assembly illustrated in FIG. 10.

In an embodiment similar to that discussed immediately above, a probe assembly 300 including a corrugated buffer section 302 is formed having a series of pyramid-shaped, as opposed to rectangular, trenches 304 in cross section, as shown in FIGS. 10 and 11. The process steps are otherwise identical to that shown in FIG. 9.

Figure 12:
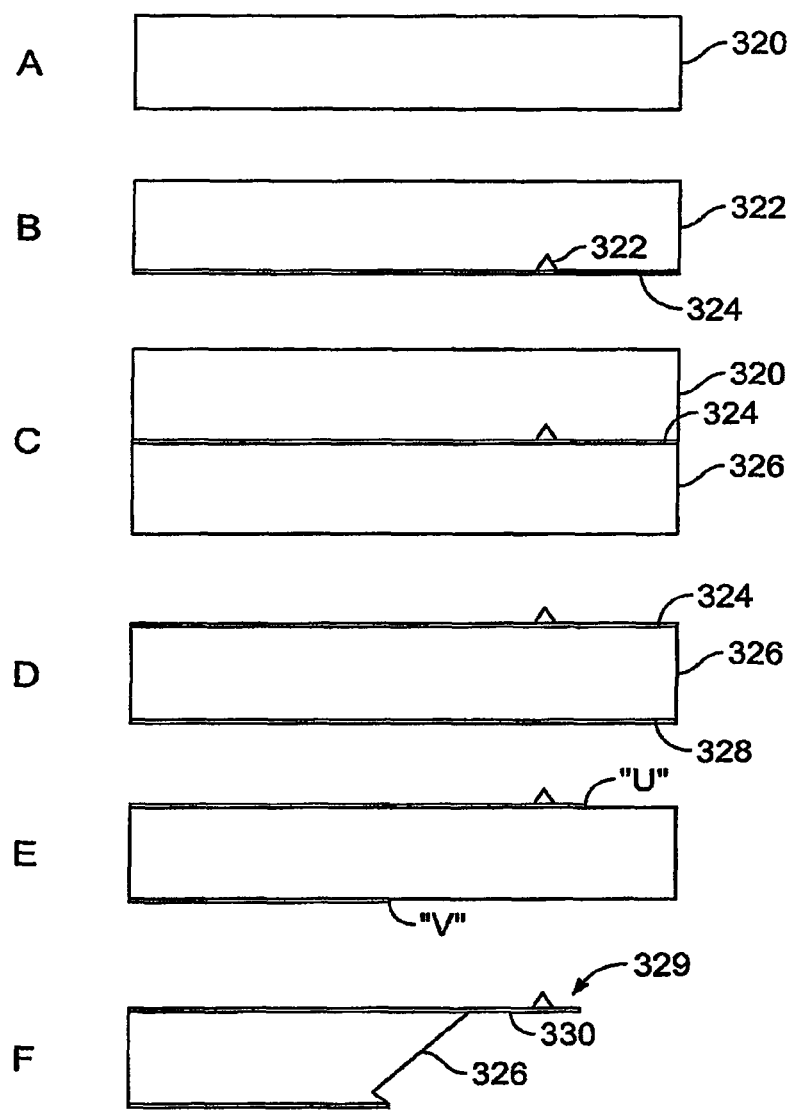
FIG. 12 is a series of schematic side elevation illustrations showing the steps to batch microfabricate a probe assembly according to another preferred embodiment of the invention using offset alignment, the bottom illustration showing a probe having a controllable short cantilever.

In a still further embodiment of bulk microfabricating a probe with a short cantilever, an offset alignment technique is employed in the process steps shown in FIG. 12, for an etch released, rather than diced, probe. In step A, a sacrificial wafer 320 is provided. In step B, a pit 322 for defining a probe tip is formed, for example, using nanodot and (111) plane overetch techniques. In addition, a silicon nitride layer 324 is deposited. Next, in step C, a substrate 326 is bonded to layer 324, for example, using fusion wafer bonding. The sacrificial wafer is then stripped using an appropriate etch, and a silicon nitride layer 328 is applied to the substrate in step D. In step E, an "offset alignment" technique is employed, including initially etching the silicon nitride from the front and back sides of the substrate to points U and V, respectively, a non-planar process. Again, it is this non-planar etching process that is difficult to control due to orthogonality and parallax considerations (which cannot be readily minimized) present during defining the length of the lever with the etches. An alignment error (as much as tens of microns) between the front and back side etches results, and thus short levers are difficult to repeatedly produce, as understood in the art.

In this embodiment, etching is accomplished with precise photolithographic patterning, for instance, to ultimately define the length of the lever with the following etch of the substrate 326. In particular, using a KOH etch in step F to etch to the (111) plane of the silicon substrate 326 at fifty-four point seven degrees (54.7°), as understood in the art, the alignment error is substantially eliminated and the length of a cantilever 330 of a probe 329 produced thereby can be repeatedly produced in bulk.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A probe assembly for a surface analysis instrument made using a substrate, the probe assembly comprising:
   a base of the probe assembly;
   a cantilever extending from the base and having a distal end; and
   wherein the length of said cantilever is predefined and is independent of any portion of the substrate upon releasing the probe assembly from the substrate during fabrication of the probe assembly; and
   a buffer section interposed between the base and said cantilever, said cantilever extending from only said buffer section.

2. The probe assembly of claim 1, wherein a portion of said buffer section extends beyond an edge of the base, and wherein said portion is more stiff than said cantilever, and wherein said buffer section is made of one of silicon nitride and silicon oxide.

3. The probe assembly of claim 2, wherein said buffer section is at least two times thicker than said cantilever.

4. The probe assembly of claim 2, wherein said portion of said buffer section is at least about 10 times as stiff as said cantilever.

5. The probe assembly of claim 1, wherein, said buffer section is made of the same material as said cantilever.

6. The probe assembly of claim 1, wherein a stiffness of said buffer section is at least about an order of magnitude greater than a stiffness of said cantilever.

7. The probe assembly of claim 6, wherein a stiffness of said buffer section is in a range of about 10 to 50 N/m.

8. The probe assembly of claim 1, wherein said cantilever has a thickness less than about 1000 nm.

9. The probe assembly of claim 8, wherein said cantilever has a thickness less than about 100 nm.

10. The probe assembly of claim 1, wherein said substrate is one of silicon and glass, and wherein an operational resonant frequency of said cantilever is in a range of about 300 to 1000 kHz.

11. The probe assembly of claim 1, wherein a length of said cantilever is less than about 50 microns.

12. The probe assembly of claim 11, wherein the length is less than about 10 microns.

* * * * *